United States Patent
Sakamoto et al.

(10) Patent No.: US 7,904,550 B2
(45) Date of Patent: Mar. 8, 2011

(54) INFORMATION PROCESSING CONTROL APPARATUS, METHOD OF DELIVERING INFORMATION THROUGH NETWORK, AND PROGRAM FOR IT

(75) Inventors: Takuya Sakamoto, Kawasaki (JP); Toru Kamiwada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 272 days.

(21) Appl. No.: 12/036,790

(22) Filed: Feb. 25, 2008

(65) Prior Publication Data

US 2008/0209036 A1 Aug. 28, 2008

(30) Foreign Application Priority Data

Feb. 28, 2007 (JP) ................................. 2007-049921

(51) Int. Cl.
*G06F 15/173* (2006.01)
*G06F 15/16* (2006.01)
*G06F 15/177* (2006.01)
*H04J 14/00* (2006.01)

(52) U.S. Cl. ............... 709/224; 398/68; 398/71; 398/72; 725/129

(58) Field of Classification Search ................. 709/203, 709/217–228; 398/66, 71, 72; 725/129
See application file for complete search history.

(56) References Cited

U.S. PATENT DOCUMENTS

| 7,616,892 B2* | 11/2009 | Suzuki et al. ................ 398/72 |
| 2005/0076374 A1 | 4/2005 | Nakamura |
| 2006/0155837 A1* | 7/2006 | Kobayashi et al. .......... 709/223 |
| 2008/0092181 A1* | 4/2008 | Britt ................................. 725/87 |
| 2008/0152305 A1* | 6/2008 | Ziegler ............................ 386/94 |
| 2009/0085762 A1* | 4/2009 | Yuki et al. ................. 340/691.6 |

FOREIGN PATENT DOCUMENTS

JP  A 2005-73142  3/2005
JP  A 2006-221438  8/2006

* cited by examiner

*Primary Examiner* — Haresh N Patel
(74) *Attorney, Agent, or Firm* — Greer, Burns & Crain, Ltd.

(57) ABSTRACT

An apparatus including a section acquiring the information as to the information processor of the delivery destination in the second network, a section alternatively providing service to an access from the first network by using the acquired information, a section receiving and delivering the information from the first network by using the alternatively supplied service, a section changing the information processor of the delivery destination in the second network to the service providing state, when the apparatus receives the information including the contents from the first network and the information processor of the delivery destination in the second network is not in the service providing state, it is possible to change the information processor of the delivery destination to the service providing state and deliver information including the contents to the information processor of the delivery destination.

16 Claims, 9 Drawing Sheets

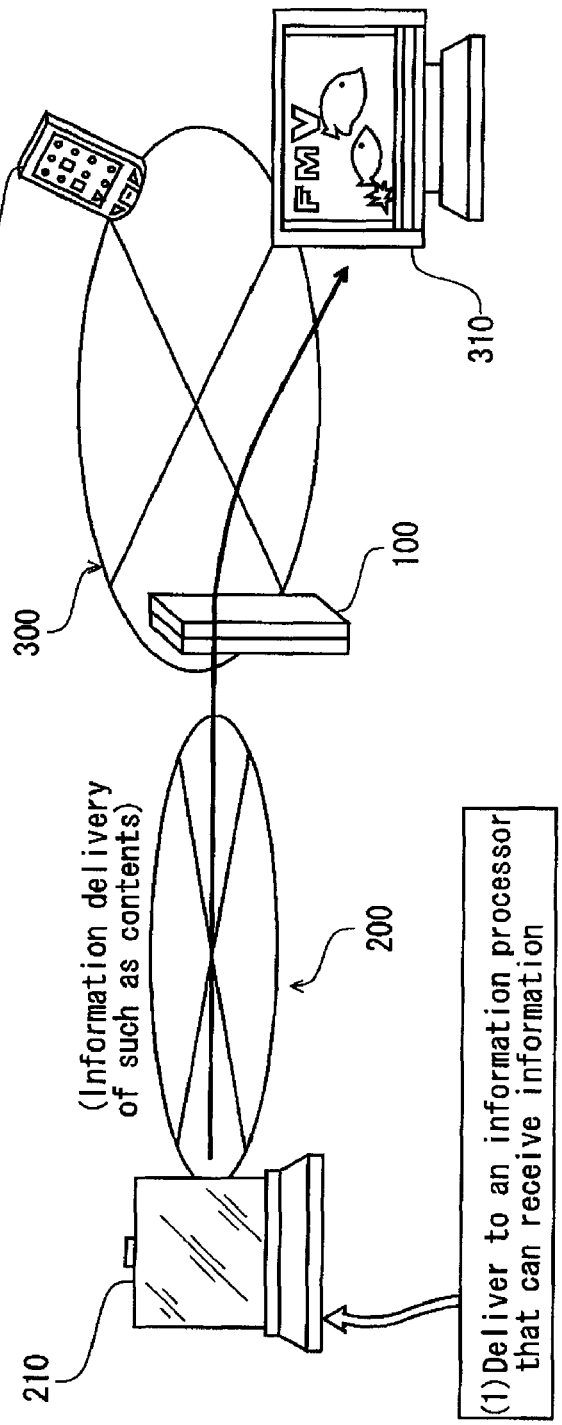

FIG. 3

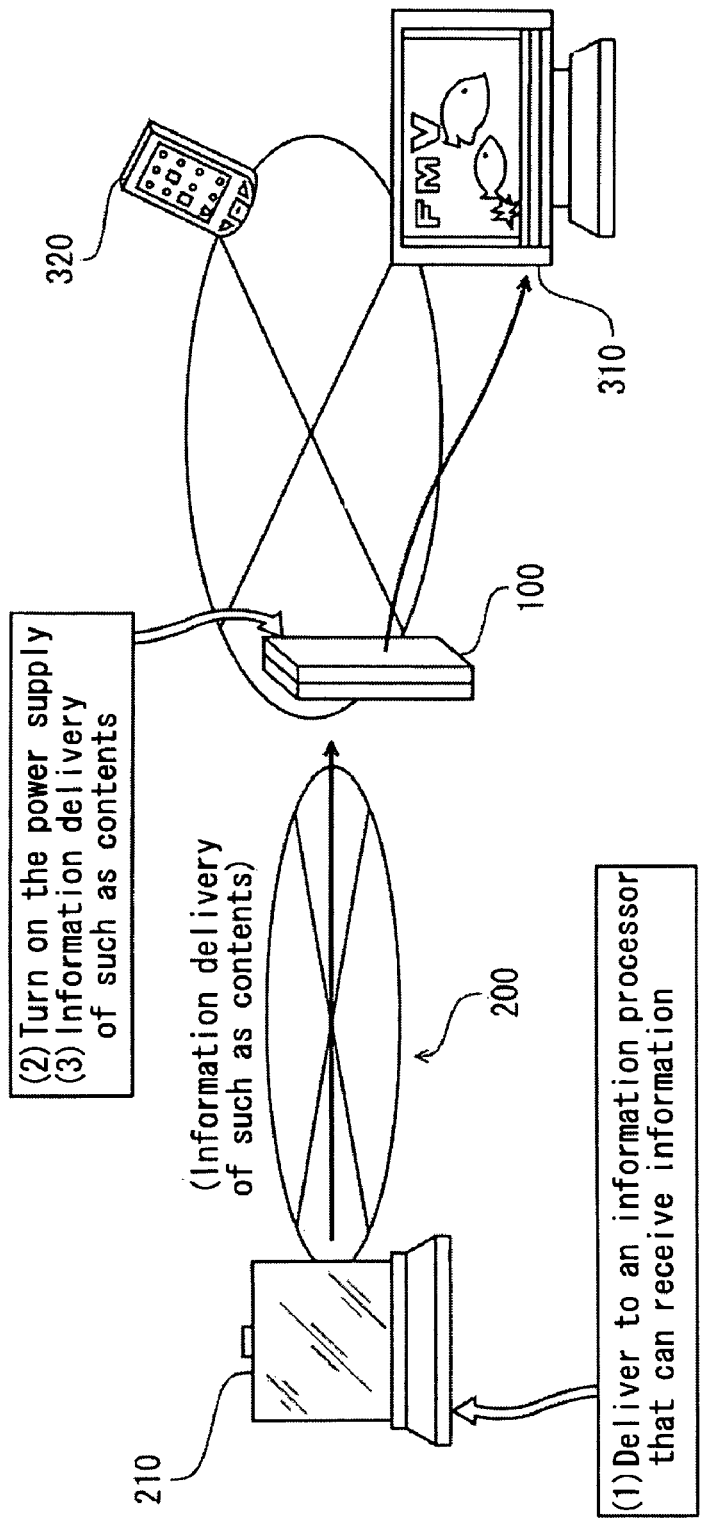

(Procedure 1) 24-hour operating gateway device is prepared between the information processor of the delivery source and the information processor of the delivery destination (Procedure 2) When information is delivered, information of the delivery destination is checked and the power supply of the information processor of the delivery destination is turned on (Procedure 3) After the power supply is turned on, the gateway device delivers information to the information processor of the delivery destination.

(2) Turn on the power supply
(3) Information delivery of such as contents (Information delivery of such as contents)

(1) Deliver to an information processor that can receive information

INFORMATION PROCESSING CONTROL APPARATUS, METHOD OF DELIVERING INFORMATION THROUGH NETWORK, AND PROGRAM FOR IT

CROSS-REFERENCE TO RELATED APPLICATIONS

This application is based upon and claims the benefit of priority from the prior Japanese Patent Application No. 2007-49921 filed on Feb. 28, 2007, the entire contents of which are incorporated herein by reference.

TECHNICAL FIELD

The present invention relates to an information processing control apparatus having functions for connecting with a plurality of networks including the first network (for example, internet) and second network (for example, home network), receiving information including the contents from the first network, and delivering it to destinations such as an information processor in the second network.

More particularly, the present invention relates to a gateway device that can acquire device information and service information of the information processor in the second network and perform various controls and operations on the information processor.

In addition, the invention relates to a method for delivering information through an arbitrary network such as a first or second network by information processing control apparatus connected to a plurality of networks and a program for it.

BACKGROUND OF THE INVENTION

With the spread of network systems including a plurality of networks, the number of households that connect personal computers (PC) and information processors such as home information appliances with home networks at home is increasing.

As a method of easily using the information processor connected with home network, a method called UPnP (Universal Plug and Play) is generally used.

UPnP is a method of automatically discovering and controlling information processors through the network, and the standardization work is done by the UPnP forum (http://www.upnp.org).

UPnP identifies what type of device the information processor in the home network is and what kind of service it provides by transmitting a definition file compliant with XML (Extensible Markup Language) that defines things such as what type of device the information processor in the home network is and what kind of service it provides.

By using this, a mechanism to use information (e.g., content) including contents from other networks through the home network is realized.

As one type of UPnP, there is a standard called UPnP AV Media Server. By using a technology compliant with this standard, a method for communicating the content information among a plurality of networks and a method of delivering the content information through home networks are defined.

Explaining in more detail, recently, it has become more popular to watch videos such as private videos and images taken with a digital camera not on the information processor where the images are accumulated but on another information processor through the home network.

At the same time, a remote access system to use the content information accumulated in the information processor at home by accessing it from outside through the internet has also increased in use.

In addition, the use of services such as video streaming service has been spread. A service to deliver video contents from an information processor such as a server connected with the internet, receive the information such as contents by using a set-top box to watch the contents is also available.

FIG. 1 is a schematic drawing showing how information is delivered through networks in a general network system. FIG. 2 is a schematic drawing showing a conventional first method to make the information delivered through networks available in home networks. FIG. 3 is a schematic drawing showing a conventional second method to make the above-mentioned information available in home networks.

In the network system shown in FIG. 1, an information processor 210 (for example, a server) of the delivery source is connected with an external network (for example, internet) 200.

On the other hand, an information processor (for example, personal computer (PC)) 310 of the delivery destination and another information processor (for example, player) 320 of the delivery destination are connected with a home network (internal network) 300.

In addition, a gateway device 100 to control a plurality of information processors (the information processor 310 of the delivery destination and another information processor 320 here) is connected to the external network 200 and the home network 300.

However, here, it is assumed that it is wanted to deliver information such as contents through the external network 200 and home network 300, from the information processor 210 of the delivery source in the external network to the information processors (the information processor 310 of the delivery destination and another information processor 320) in the home network 300.

In the network system in FIG. 1, to deliver the content information from the information processor of the delivery source in the external network or from the information processor in the home network of another household, to the information processor in the home network of one household, it is necessary that one information processor of the delivery destination (for example, another information processor 320 of the delivery destination) be connected with the home network. Also, the power supply of the information processor is turned on (that is, it enters the service providing state in which service to receive the information such as contents can be supplied).

Conversely speaking, when the power supply of the information processor of the delivery destination turns off, because it is impossible for the information processor of the delivery destination to receive the content information, an inconvenient situation in which the information cannot be effectively used in the household of the delivery destination occurs.

As a first method to solve such an inconvenient situation and make it possible to use the content information in the home network, as shown in FIG. 2, a method has been used in which the information is received first by an information processor (for example, information processor 310 of the delivery destination) that is different from the intended information processor (for example, information processor 320 of the delivery destination), and the information is later received by the information processor that uses the information through the home network.

Explaining in more detail, as the information processor of the delivery destination, the 24-hour operating information processor 310 (for example, personal computer) is prepared as a server, and this information processor 310 temporarily receives and acquires the information such as contents delivered from the information processor 210 of the delivery destination.

In this case, the information processor 210 of the delivery source has to deliver the information to the information processor 310 that can always receive the information (Step 1).

Next, after turning on the power supply of another information processor 320 (for example, player) of the delivery destination and starting the information processor 320, the information is downloaded from the 24-hour operating information processor 310, which makes the information such as contents available in the home network (Step 2).

On the other hand, as the conventional second method to make the information available on the home network, for example, as shown in FIG. 3, a method in which the gateway device 100 alternatively provides service by using the device information and service information of the information processors (information processor 310 of the delivery destination and another information processor 320) of the delivery destination in the home network and control the power supply state of the information processor.

This method provides access from an external network regardless of the power supply state of the information processor of the delivery destination by turning on the power supply of the information processor of the delivery destination with the gateway device 100 if necessary.

Explaining in more detail, the 24-hour operating gateway device 100 is prepared between the information processor 210 of the delivery source and the information processor of the delivery destination (Step 1).

Next, when the information such as contents is delivered from the information processor 210 of the delivery source, the gateway device 100 checks the information of the delivery destination and turns on the power supply of the information processor of the delivery destination (for example, the information processor 310 of the delivery destination) (Step 2).

In addition, after the power supply of the information processor of the delivery destination turns on, the gateway device 100 delivers the information such as contents to the information processor of the delivery destination.

Here, when the information such as contents is delivered, by changing the state of the power supply of the information processor that receives the information, the information such as contents can be used in the home network (Step 3).

However, in the first method in above-mentioned FIG. 2, because one information processor (24-hour operating information processor) functioning as a server receives and controls the information of all the contents, the information processor can run out of storage capacity. Also, the information delivery side as a server sometimes cannot determine to which information processor the information should be delivered.

On the other hand, in the second method in above-mentioned FIG. 3, the gateway device that controls the information processor of the delivery destination in the home network receives an access from an external network once, then it identifies which information processor to deliver to.

However, in this method, when the delivery frequency of the information such as contents becomes high depending on the service use state, change between on and off of the power supply of the information processor of the delivery destination is repeated and a problem of increasing the power consumption of the information processor occurs.

In addition, when the state of power supply of the information processor of the delivery destination cannot change (for example, the information processor is not connected with networks temporarily), the information such as contents cannot be delivered.

Here, for reference, as related art document with regard to the above-mentioned conventional method, Japanese Laid-open Patent Application No. 2005-73142 is indicated.

Patent document 1 (Japanese Laid-open Patent Publication No. 2005-73142), in a wireless AV station 101, discloses a data transmitter that controls the supply of power supply V4 to a communication section 313 that functions as a router and the supply of power supplies V1 and V3 to AV buses 211 and 215 independently, further controls the supply of the power supply V1 to the AV bus 211 that receives broadcast data and the supply of the power supply V3 to the AV bus 215 that receives content data from an external device independently.

Because such configuration, depending on the service use state of each AV bus 211 and 215, can turn on and off the power supply of the AV bus 211 and the power supply of the AV bus 215 respectively, power can be supplied to only necessary buses.

However, Patent document 1 does not refer to a concrete method to solve the problem that power consumption increases due to the repetition of changing between on and off of the power supply of such as a communication section and AV bus when the frequency of using services such as communication service, broadcast program receiving service and contents data receiving service at all.

As a result, Patent document 1 cannot solve such a problem that occurs when the information such as contents is delivered to the information processor of the delivery destination through the network by the above-mentioned conventional second method.

SUMMARY

In view of the above-mentioned problem, an object of the present invention is to provide a method to prevent the power consumption of the information processor from increasing due to the repeatedly changed power supply state of the information processor of the delivery destination when the frequency of the delivery of the information such as contents becomes high, and to deliver information through an information processing control apparatus and networks that make it possible to efficiently deliver the information such as contents and a program for it even when the power supply state of the information processor of the delivery destination cannot be changed.

According to an aspect of an embodiment, an apparatus includes: a device information and service information acquiring section connected with a plurality of networks including the first and second networks and acquiring the device information and service information of the information processor of the delivery destination in the above-mentioned second network; a service providing section alternatively providing service to an access from the above-mentioned first network by using the acquired above-mentioned device information and service information; a service using section receiving and delivering the information including the contents from the above-mentioned first network by using the above-mentioned alternatively supplied service; a service providing state change section changing the information processor of the delivery destination in the above-mentioned second network to the service providing state (for example, turn on the power supply of the information processor of the delivery destination); when the apparatus receives the information including the above-mentioned contents from the above-mentioned first network and the information processor of the delivery destination in the above-mentioned second network is not in the service providing state, it is possible to change the information processor of the delivery destination to the service providing state and deliver information including the above-mentioned contents to the information processor of the delivery destination.

Here, the information processing control apparatus according to one mode of the present invention, further includes: a contents information recording section for recording information including the above-mentioned received contents; a device rest capacity detecting section where the above-mentioned information processing control apparatus itself detects the rest recordable capacity; and a contents information deletion section for deleting the recorded information including the above-mentioned contents.

This configuration can be used when the information processor of the delivery destination in the above-mentioned second network is not in the service providing state, and it receives the information including the contents from the first network. It temporarily records the information including the above-mentioned contents by the above-mentioned contents information recording section. When the rest capacity detecting section detects that the above-mentioned recordable rest capacity is less than the predetermined value, it changes the information processor of the delivery destination in the above-mentioned second network to the service providing state and delivers the information including the above-mentioned contents to the information processor of the delivery destination. Then, the contents information deletion section deletes the information including the above-mentioned contents.

Preferably, the first network is configured by the external network such as internet and the second network is configured by the home network (internal network).

On the other hand, the information processing control apparatus of the present invention is configured by the gateway device that controls the information processor of the delivery destination in the home network.

Preferably, in the information processing control apparatus according to one mode of the present invention, before it is detected that the above-mentioned recordable rest capacity is less than the predetermined capacity, if the information processor of the delivery destination in the above-mentioned second network enters the service providing state, the above-mentioned contents information deletion part deletes the information including the above-mentioned contents after delivering the information including the above-mentioned contents to the information processor of the delivery destination.

On the other hand, the information processing control apparatus according to another mode of the present invention, can be connected with a plurality of networks including the first and second networks similarly to the information processing control apparatus according to above-mentioned one mode of the present invention, including: a device information and service information acquiring section of the information processor of the delivery destination in the above-mentioned second network; a service providing section for alternatively providing service by using the above-mentioned acquired device information and service information from the above-mentioned first network; a service using section for receiving and delivering the information including the contents from the above-mentioned first network by using the alternatively provided above-mentioned service; and a service providing state change section for changing the information processor of the delivery destination in the above-mentioned second network to the service providing state.

When the apparatus receives information including the above-mentioned contents from the above-mentioned first network, if the information processor of the delivery destination in the above-mentioned second network is not in the service providing state, it is possible to change the information processor of the delivery destination to the service providing state and deliver information including the above-mentioned contents.

Here, the information processing control apparatus according to another mode of the present invention, further includes: a contents information recording section for recording information including the above-mentioned received contents; a time elapse detecting section for detecting the time elapsed after receiving information including the above-mentioned contents; and a contents information deletion section for deleting information including the above-mentioned recorded information.

This configuration can be used when the information processor of the delivery destination in the above-mentioned second network is not in the service providing state and receives information including the contents from the first network. The above-mentioned contents information recording section temporarily records information including the above-mentioned contents, and when the above-mentioned time elapse detecting section detects that more than the predetermined time elapses, it changes the information processor of the delivery destination in the above-mentioned second network to the service providing state. Then, after delivering information including the above-mentioned contents to the information processor of the delivery destination, the above-mentioned contents information deletion section deletes information including the above-mentioned contents.

Preferably, in the information processing control apparatus according to another mode of the present invention, before it is detected that more than the predetermined time has elapsed after receiving information including the above-mentioned contents, if the information processor of the delivery destination in the above-mentioned second network enters the service providing state, the above-mentioned contents information deletion section deletes information including the above-mentioned contents after delivering information including the above-mentioned contents to the information processor of the delivery destination.

Preferably, the information processing control apparatus according to the above-mentioned two modes further comprises a rest capacity detection part for detecting the recordable rest capacity of the information processor of the delivery destination in the above-mentioned second network. If it is detected that the recordable rest capacity of the information processor of the delivery destination is less than the predetermined capacity when information including the above-mentioned contents is delivered to the information processor of the delivery destination in the above-mentioned second network, information including the above-mentioned contents is not delivered.

Preferably, the information processing control apparatus according to the above-mentioned two modes further comprises a rest capacity detecting section of the information processor for detecting the recordable rest capacity of the information processor of the delivery destination in the above-mentioned second network, and a rest capacity increasing instruction section for instructing to increase the above-mentioned recordable rest capacity to the information processor of the delivery destination in the above-mentioned second network. If it is detected that the recordable rest capacity of the information processor of the delivery destination is less than the predetermined capacity when the information including the above-mentioned contents is delivered to the information processor of the delivery destination in the above-mentioned second network, the above-mentioned rest capacity increasing instruction section instructs to increase the recordable rest capacity, the recordable rest capacity is increased and the information including the above-mentioned contents is delivered.

On the other hand, a method for delivering information through the network of the present invention includes a step for receiving information including the above-mentioned contents from the above-mentioned first network by the information processing control apparatus connected with a plurality of networks including the first and second networks; a step for detecting whether the information processor of the delivery destination in the above-mentioned second network is in the service providing state or not; a step in which the above-mentioned information processing control apparatus itself detects the recordable rest capacity; a step for temporarily recording information including the above-mentioned contents by the above-mentioned information processing control apparatus when the information processor of the delivery destination in the second network is not in the service providing state and the above-mentioned information processing control apparatus receives information including the above-mentioned contents; a step for changing the information processor of the delivery destination in the second network to the service providing state when it is detected that the above-mentioned recordable rest capacity is less than the predetermined capacity; and a step for delivering information including the above-mentioned contents to the information processor changed to the service providing state of the delivery destination in the above-mentioned second network.

On the other hand, this invention, in the information processing control apparatus connected with a plurality of networks including the first and second networks, provides a program for: receiving the information including the contents from the above-mentioned first network in the computer; detecting whether the information processor of the delivery destination in the above-mentioned second network is in the service providing state or not; making the above-mentioned information processing control apparatus itself detect the recordable rest capacity; making the above-mentioned information processing control apparatus temporarily record the information including the above-mentioned contents when the information processor of the delivery destination in the above-mentioned second network is not in the service providing state and the above-mentioned information processing control apparatus receives information including the above-mentioned contents; changing the information processor of the delivery destination in the above-mentioned second network to the service providing state when it is detected that the above-mentioned recordable rest capacity is less then the predetermined capacity; and making the information processor change to the service providing state of the delivery destination in the above-mentioned second network and deliver information including the above-mentioned contents.

BRIEF DESCRIPTION OF THE DRAWINGS

FIG. 2 is a schematic diagram showing a conventional first method to make information delivered through network available in the home network.

FIG. 3 is a schematic diagram showing a conventional second method to make information delivered through network available in the home network.

DETAILED DESCRIPTION OF THE EMBODIMENTS

Hereafter, a configuration and operation of the preferred embodiment of the present invention are explained in reference to the attached drawings (FIG. 4 to FIG. 9).

Figure 1:
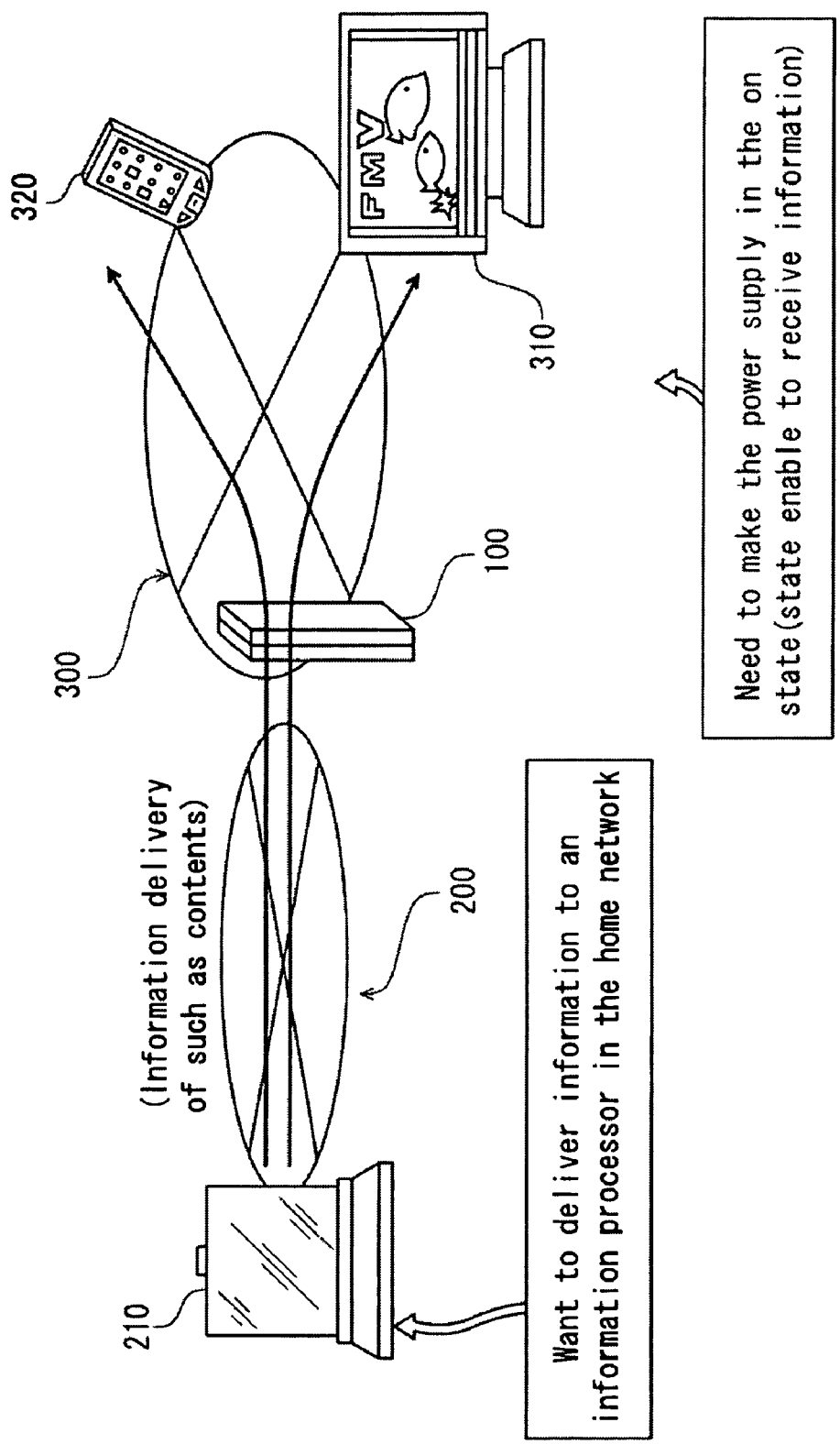
FIG. 1 is a schematic diagram showing that information is delivered through the network in a general network system.
Figure 4:
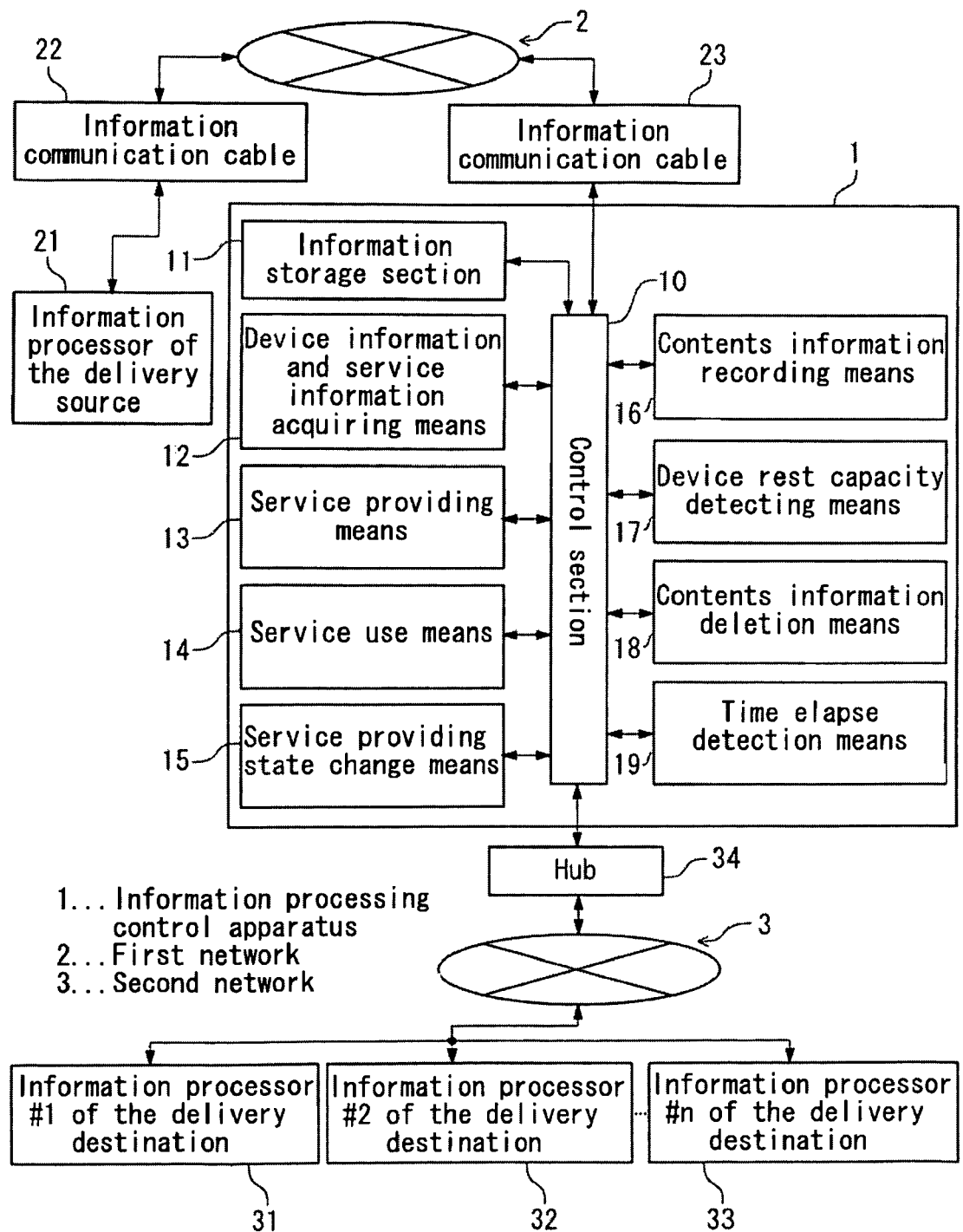
FIG. 4 is a block diagram showing the configuration of the information processing control apparatus of one embodiment of the present invention.

FIG. 4 is a block diagram showing the configuration of the information processing control apparatus of one embodiment of the present invention.

However, here, the configuration of an information processing control apparatus 1 of one embodiment of the present invention and the network system including this information processing control apparatus 1 are simplified and shown.

In addition, hereinafter, those having the same configuration elements as the above-mentioned ones are shown with the same reference numbers.

In the network system in FIG. 4, an information processor 21 (for example, server) of the delivery source is connected with the first network (for example, external network such as internee) 2 through an information communication cable (for example, optical fiber network connected to the home) 22.

On the other hand, a plurality of information processors (in FIG. 4, information processor (#1) 31 of the delivery destination, information processor (#2) 32 of the delivery destination, information processor (#n) 33 of the delivery destination (however, n is an arbitrary positive integer that is 2 or more)) are connected with the second network (for example, home network) 3.

In addition, in the network system in FIG. 4, the information processing control apparatus 1 according to one embodiment of the present invention is connected with the first network 2 through an information communication cable 23 and the second network 3 through a hub 34.

Here, it is also possible that the information processing control apparatus 1 is connected with a plurality of networks other than the first network 2 and the second network 3.

Preferably, the information processing control apparatus 1 is configured by the gateway device to control a plurality of information processors of the delivery destination.

Explaining in more detail, the information processing control apparatus 1 according to the embodiment shown in FIG. 4 includes a device information and service information acquiring means 12, service providing means 13, service use means 14, and service providing state change means 15.

The device information and service information acquiring means 12 acquires the device information of the information processors 31 to 33 of the delivery destination in the second network 3.

The service providing means 13 alternatively provides service by using the acquired device information and service information to obtain access from the first network 2.

The service use means 14 receives and delivers the information such as contents from the first network 2 by using the alternately provided service.

A service providing state change means 15 changes the information processors 31 to 33 of the delivery destination if necessary.

That the above-mentioned service providing state change means 15 "changes the information processor of the delivery destination to the service providing state" means, for example, a function to change the power supply of the information processor using the information such as contents in a plurality of information processors of the delivery destination from the off state to the on state.

In addition, the above-mentioned service providing state change means 15 can change the power supply of the information processor to the on state and deliver the information such as contents to the information processor when it receives the information from the first network 2 and if the power supply of the information processor using the information such as contents in the second network 3 is not in the on state.

The information processing control apparatus 1 according to the embodiment of FIG. 4 comprises a control section 10 for comprehensively controlling the operations of the above-mentioned device information and service information acquiring means 12, service providing means 13, service use means 14, and service providing state change means 15 to deliver the information such as contents through a plurality of networks including the first network 2 and second network 3.

As described later, the functions of the above-mentioned device information and service information acquiring means 12, service providing means 13, service use means 14, service providing state change means 15 and control section 10 are realized by executing various programs (software) by the CPU (central processing unit) of a general-purpose personal computer.

The control section 10 in FIG. 4 has various programs for delivering the information such as contents through a plurality of networks and the information storage section 11 stores various data such as device information and service information of the information processors of the delivery destination.

The information storage section 11 is for example, ROM (Read only Memory) and RAM (Random Access Memory).

In addition, the information processing control apparatus 1 according to the embodiment in FIG. 4 has a contents information recording means 16, a device rest capacity detection means 17, contents information deletion means 18, and time elapse detection means 19.

The contents information recording means 16 includes database to temporarily record the information such as contents received from the first network 2.

The device rest capacity detection means 17 detects the recordable rest capacity of the information processing control apparatus itself.

The contents information deletion means 18 deletes the recorded information such as contents.

The time elapse detection means 19 detects the elapsed time after receiving the information such as contents.

According to the above-mentioned configuration, the information processing control apparatus 1 according to the present embodiment, temporarily records information received from the first network, and after confirming that the recordable rest capability of the information processing control apparatus itself is less than the predetermined capacity, turns the power supply of the information processor of the delivery destination on to change to the service providing state. Then it becomes possible to deliver information to the information processor of the delivery destination.

As a result, because the information processing control apparatus 1 according to the present embodiment needs not change the on/off states of the power supply of the information processor of the delivery destination each time it receives information including contents from the first network, it becomes possible to drastically decrease the number of changing between on/off states of the power supply of the information processor of the delivery destination when the frequency of delivering information including contents becomes high. This prevents the power consumption of the information processor from increasing and efficiently delivers the information such as contents.

In addition, though it is not shown in FIG. 4, the information processing control apparatus 1 according to the present embodiment has a current time detection means, a rest capacity detection means of the information processor, a rest capacity increasing instruction means of the information processor, and a contents information deletion instruction means.

The current time detection means detects whether the current time is the predetermined time or not.

The rest capacity detection means of the information processor detects the recordable rest capacity of the information processor of the delivery destination in the second network.

The rest capacity increasing instruction means of the information processor instructs the information processor of the delivery destination in the second network to increase its recordable rest capacity.

The contents information deletion instruction means determines the priority (essentiality) of the information such as contents delivered to the information processor of the delivery destination in the second network, and instructs to delete information of low priority.

As a result, because the information processing control apparatus 1 according to the present embodiment need not change the on/off states of the power supply of the information processor of the delivery destination immediately after it receives information including contents from the first network, it becomes possible to drastically decrease the number of changes of the on/off states of the power supply of the information processor of the delivery destination when the frequency of delivering information including contents becomes high, and to easily function even when the power supply of the information processor of the delivery destination cannot change immediately.

The above-mentioned current time detection means, rest capacity detection means of the information processor, rest capacity increasing instruction means of the information processor and contents information deletion instruction means are also realized by executing various programs by the CPU of a general-purpose personal computer.

The information processing control apparatus 1 according to the present embodiment can realize the following functions as shown in the following paragraphs (1) to (4) by having the above-mentioned contents information recording means 16, device rest capacity detection means 17, contents information deletion means 18, and time elapse detection means 19.

When the power supply of the information processor of the delivery destination in the second network is not in the on state and it receives the information such as contents from the first network, the contents information recording means 16 temporarily records the information received in the database of the information processing control apparatus itself. In addition, when it is detected that the recordable rest capacity of the information processing control apparatus itself is less than the predetermined capacity, it changes the state of the power supply to the information processor of the delivery destination and turns this power supply on, then delivers the information such as contents to the information processor of the delivery destination.

When the power supply of the information processor of the delivery destination in the second network is not in the on state and it receives the information such as contents from the first network, the contents information recording means 16 temporarily records the information such as contents received in the database of the information processing control apparatus itself. In addition, when the power supply of the information processor of the delivery destination in the second network switches to the on state before the recordable rest capacity of the information processing control apparatus itself becomes less than the predetermined capacity, it delivers the information such as contents to the information processor of the delivery destination.

When the power supply of the information processor of the delivery destination in the second network is not in the on state and it receives the information such as contents from the first network, the contents information recording means 16 temporarily records the information received in such database of the information processing control apparatus itself. In addition, when more than the predetermined time elapses after receiving the information such as contents, it changes the state of the power supply to the information processor of the delivery destination to make turn the power supply to the on state and delivers the information to the information processor of the delivery destination.

When the power supply of the information processor of the delivery destination in the second network is not in the on state and it receives the information such as contents from the first network, the contents information recording means 16 temporarily records the information received in such database of the information processing control apparatus itself. In addition, when the power supply of the information processor of the delivery destination in the second network enters the on state before more than the predetermined time elapses after receiving the content information, it delivers the information to the information processor of the delivery destination.

In addition, on any one of the above-mentioned functions, after delivering the above-mentioned information such as contents temporarily recorded in the information processor of the delivery destination, the above-mentioned data such as contents temporarily recorded is deleted from the database.

As a result, it becomes possible to record the information such as contents being delivered next in such as database of the information processing control apparatus itself.

As described later, the above-mentioned contents information recording means 16 is realized by hardware such as a large-capacity database.

On the other hand, the functions of the above-mentioned device rest capacity detection means 17, contents information deletion means 18, and time elapse detection means 19 are realized by executing various programs by the CPU of a general-purpose personal computer.

In addition, the information processing control apparatus 1 according to the present embodiment can realize the following accompanying functions as shown in following paragraphs (a) to (g) by the above-mentioned means to show additional features of the present invention.

When the power supply of the information processor of the delivery destination in the second network is not in the on state and it receives the content information from the first network, the contents information recording means 16 temporarily records the information such as contents received in such database of the information processing control apparatus itself. In addition, when the current time the predetermined time, it changes the state of the power supply to the information processor of the delivery destination and turns the power supply on, then delivers the information to the information processor of the delivery destination.

When the power supply of the information processor of the delivery destination in the second network is not in the on state and it receives the information such as contents from the first network, the contents information recording means 16 temporarily records the information received in such database of the information processing control apparatus itself. In addition, when the power supply of the information processor of the delivery destination in the second network enters the on state before the current time becomes the predetermined time, it delivers the information such as contents to the information processor of the delivery destination.

The recordable rest capacity of the information processor of the delivery destination in the second network is checked and depending on this rest capacity, it is determined whether to deliver the information such as contents to the information processor or not.

After an instruction to increase the recordable rest capacity is issued to the information processor of the delivery destination in the second network, the information such as contents is delivered to the information processor.

The importance or priority of the information such as contents that the information processor of the delivery destination in the second network has is checked. An instruction to delete information with low priority is issued and after that, the information such as contents is delivered to the information processor.

When the rest capacity of both the instruction processing control apparatus and information processor of the delivery destination is low, the information such as contents is temporarily transmitted to another information processor and after a predetermined time, the information is received again from another information processor and is delivered to the information processor of the delivery destination.

Even if the state of the power supply is changed to the information processor of the delivery destination, if this power supply does not enter the on state (for example, when the information processor of the delivery destination is not connected with the network), the information such as contents is temporarily transmitted to another information processor. In addition, if the above-mentioned power supply is on when it is checked again after the predetermined time, the information such as contents is received again from another information processor and delivered to the information processor of the delivery destination.

The information processing control apparatus according to the embodiment in FIG. 4, by the above-mentioned functions, even when the frequency of delivering the information such as contents becomes high or the state of the power supply of the information processor of the delivery destination cannot change immediately, can easily handle and efficiently deliver the information such as contents.

Figure 5:
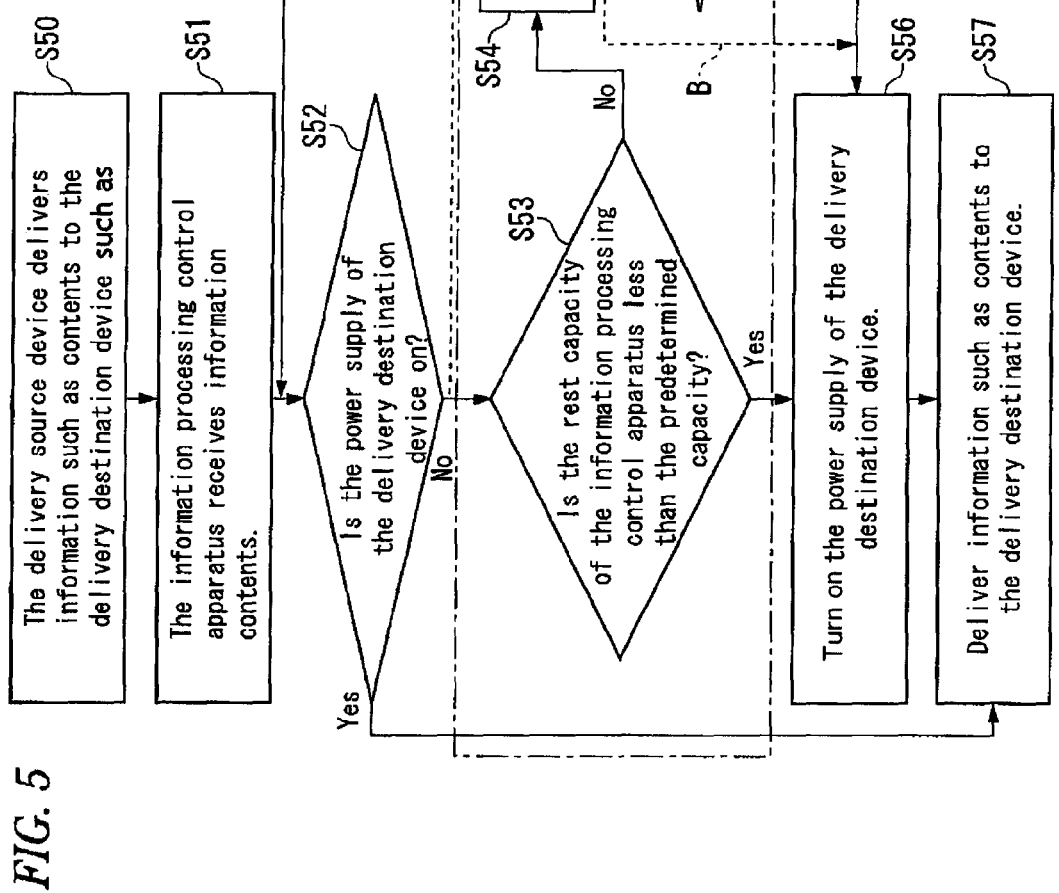
FIG. 5 is a flow chart explaining the main processing functions of the information processing control apparatus of the embodiment in FIG. 4.

FIG. 5 is a flow chart explaining the main processing functions of the information processing control apparatus according to the embodiment in FIG. 4.

The processing flow to deliver the information such as contents in the information processing control apparatus (refer to FIG. 4) according to the present embodiment is described as follows:

First of all, the information processor of the delivery destination in the first network (abbreviated to the apparatus of the delivery source in FIG. 5) delivers the information such as contents to the information processor (abbreviated to the apparatus of the delivery destination in FIG. 5) of the delivery destination in the second network.

The information processing control apparatus 1 receives the information such as contents from the first network (S51 in FIG. 5).

Next, the information processing control apparatus 1 checks whether the power supply of the information processor is in the on state or not (S52 in FIG. 5).

The information processing control apparatus 1 checks whether the recordable rest capacity of the information processing control apparatus itself is less than the predetermined capacity or not (S53 in FIG. 5) when it is confirmed that the power supply of the information processor of the delivery destination is not in the on state (but in the off state).

The information processing control apparatus 1 temporarily records (S54 in FIG. 5) the received information such as contents in its database when it is confirmed that the recordable rest capacity of the information processing control apparatus itself is more than the predetermined capacity (No in S53 in FIG. 5).

In addition, proceeding from Step S54 to S55, it is checked whether more than the predetermined time elapses or not after the information processing control apparatus receives the information such as contents. In Step S55, if it is confirmed that more than the predetermined time has not elapsed, operations from above-mentioned Step S52 to S54 are repeated. On the other hand, if it is confirmed that more than the determined time has elapsed, the process proceeds to Step S56 and the power supply of the information processor of the delivery destination is changed from the off state to the on state.

Meantime, the information processing control apparatus 1 changes the power supply of the information processor of the delivery destination from the off state to the on state (S56 in FIG. 5) when it is confirmed that the recordable rest capacity of the information processing control apparatus itself is less than the predetermined capacity in the above-mentioned determination processing (Yes in S53 in FIG. 5).

The information processing apparatus 1 delivers the information such as contents to the information processor of the delivery destination (S57 in FIG. 5) after turning the power supply of the information processor of the delivery destination on (S56 in FIG. 5).

On the other hand, in the above-mentioned determination processing in S52, the information processing control apparatus 1 delivers the information such as contents to the information processor of the delivery destination (S57 in FIG. 5) if it is confirmed that the power supply of the information processor of the delivery destination is already in the on state (Yes in S52 in FIG. 5).

In addition, the above-mentioned determination processing in S52 is always executable if it is at a stage before checking whether the recordable rest capacity of the information processing control apparatus itself is less than the predetermined capacity or not, or at a stage before checking whether more than the predetermined time has elapsed after the information processing control apparatus received the information such as contents or not.

On the processing flow that delivers the information such as contents in the information processing control apparatus according to the present embodiment as shown in FIG. 5, a part A including the processing of above-mentioned Step S53, S54 and S55 is one of the new processing functions as compared with the above-mentioned conventional method (for example, refer to FIG. 3).

In addition, as shown in the dotted line B in FIG. 5, the information processing control apparatus 1 according to the present embodiment can omit the processing of Step S55. That is, the information processing control apparatus 1 according to the present embodiment can temporarily accumulate the information such as received contents (S54 in FIG. 5) and turn the power supply of the information processor of the delivery destination on (S56 in FIG. 5) when it is confirmed that the recordable rest capacity of the information processing control apparatus itself is less than the predetermined capacity (No in S53 in FIG. 5).

In addition, as shown in a dotted line C in FIG. 5, the information processing control apparatus 1 according to the present embodiment can omit the processing of Step S53. That is, when it is confirmed that the power supply of the delivery destination device is in the off state (No in S52 in FIG. 5), the information processing control apparatus 1 according to the present embodiment can also temporarily accumulate the received information such as contents (S54 in FIG. 5), confirm that more than the predetermined time has elapsed after receiving the information such as contents (Yes in S55 in FIG. 5) and turn the power supply of the information processor of the delivery destination on (S56 in FIG. 5).

Figure 6:
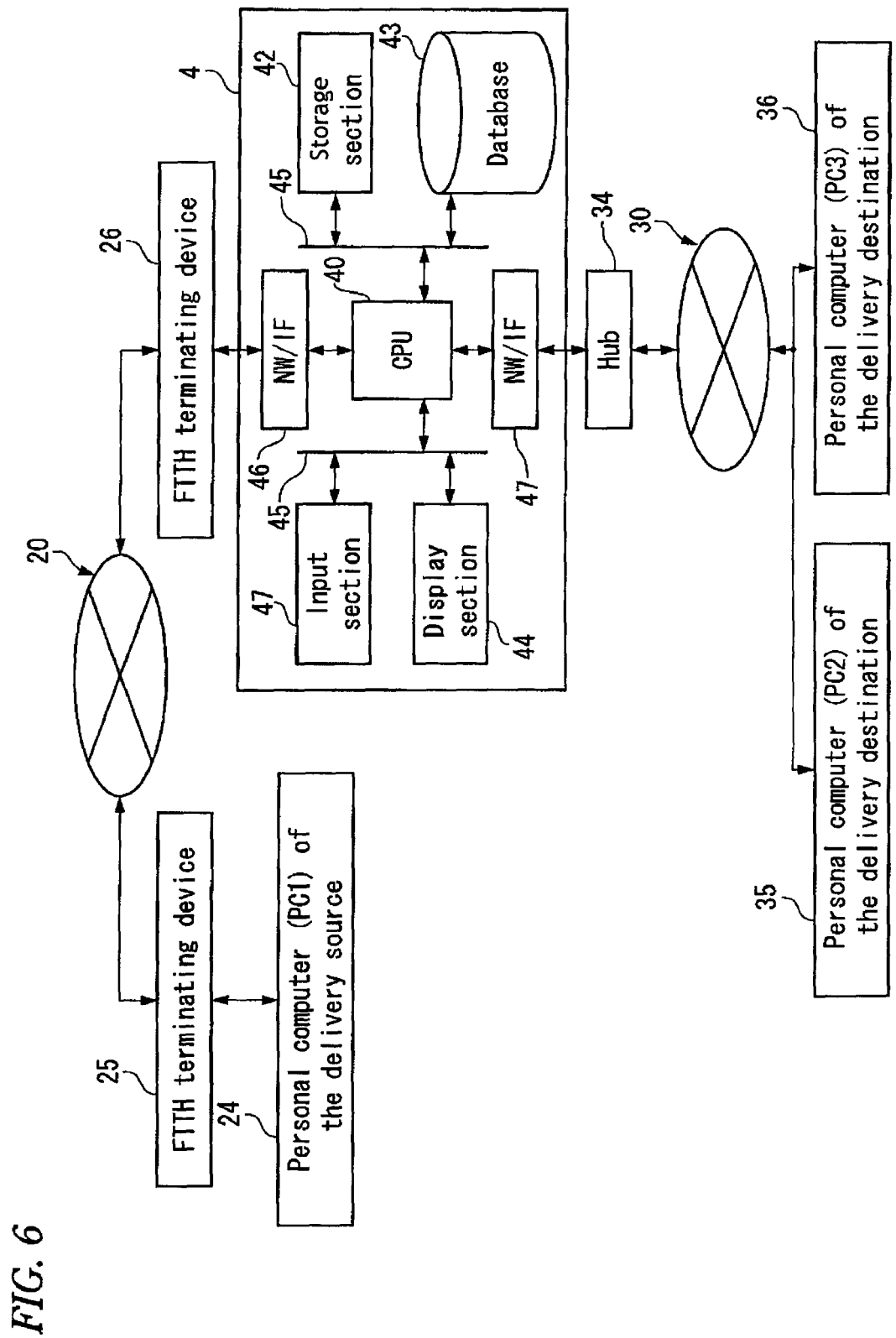
FIG. 6 is a block diagram showing a concrete example of the network system including the information processing control apparatus of the embodiment in FIG. 4.

FIG. 6 is a block diagram for showing a concrete example of the network system including the information processing control apparatus according to the present embodiment shown in FIG. 4. However, the configuration of the network system in the concrete example is simplified as shown.

The network system in FIG. 6 includes the internet 20 configuring the external network as the first network (refer to FIG. 4) and home network 30 configuring domestic LAN (Local Area Network) as a second network (refer to FIG. 4).

In addition, as the information processor of the delivery source (refer to FIG. 4), a personal computer (PC1) 24 as a server device of the delivery source is connected to the internet 20 through FTTH (Fiber To The Home) terminating device 25 comprising a domestic optical fiber network.

Further, as the information processor of the delivery source, network home appliances and other devices can be used.

In addition, in the network system in FIG. 6, as a plurality of information processors of the delivery destination (refer to FIG. 4), the personal computer (PC2) 35 and personal computer (PC3) 36 are connected with the home network 30.

The personal computer (PC2) 35 and personal computer (PC3) 36 of the delivery destination are information processors that receive the information such as contents through the internet 20. Users can access the information such as contents by these information processors.

In addition, the network system in FIG. 6, as the information processing control apparatus according to one embodiment of the present invention (refer to FIG. 4) includes a gateway device 4 that can acquire the device information and service information about the personal computers PC2 and PC3 of the delivery destination in the home network 30 and perform various controls to the information processor.

The gateway device 4 is connected to the home network 30 through one network interface (NW/IF) 47 and hub 34.

The gateway device 4 is connected to the internet 20 through the other network interface (NW/IF) 46 and a FTTH terminating device 26.

In addition, the gateway device 4 can also be connected with a plurality of networks other than the internet 20 and home network 30.

The system configuration of the network system including such gateway device 4 is a general configuration when accessing from a domestic LAN to the internet.

Explaining in more detail, in the gateway device 4 in FIG. 6, the functions of the above-mentioned various means in FIG. 4 (for example, the device information and service information acquiring means 12, service providing means 13, service use means 14, service providing state change means 15, device rest capacity detection means 17, contents information deletion means 18, and time elapse detection means 19 in FIG. 4) and the function of the control section 10 are realized by the CPU 40 of a general-purpose personal computer.

This gateway device 4 comprises a storage section 42 (corresponding to the information storage section 11 in FIG. 4).

The storage section 42 stores various programs for delivering the information such as contents through a plurality of networks, and various programs including device information and service information of the information processor of the delivery destination.

The storage section 42 is, for example, ROM and RAM.

In addition, the gateway device 4 shown in FIG. 6 is described by dividing the CPU 40 and the storage section 42 into various blocks, though it is also possible to mount the storage section 42 in the CPU 40.

The gateway device 4 provides various means in the gateway device and functions of the control section by reading various programs stored in such as ROM and various data necessary for executing the programs stored in such as RAM from the CPU 40 and executing the read programs in the CPU 40.

In addition, the gateway device 4 in FIG. 6 has an input section 41 and display section 44.

The input section 41 can include for example keyboard and mouse to input the data related to various data necessary for executing programs.

The display section 44 displays the data input by operating the input section 41 and displays that the information such as contents is delivered.

In addition, the gateway device 4 in FIG. 6 has a database 43 to temporarily record the information such as contents received from the internet 30 as the contents information recording means 16 in the above-mentioned FIG. 4.

The database 43 is, for example, a large-capacity hard disk drive (HDD).

The above-mentioned CPU 40, storage section 42, input section 41, display section 44 and database 43 are mutually connected by a bus 45.

The personal computers PC2 and PC3 of the delivery destination in FIG. 5 are, for example, information processors compliant with UPnP (Universal Plug and Play).

The equipment compliant with UPnP includes a UPnP device that can be controlled by UPnP and a UPnP control point that controls a UPnP device.

In addition, in the above-mentioned embodiment, the personal computers (information processors) PC2 and PC3 are regarded as UPnP devices and the personal computer (information processor) PC1 is regarded as a UPnP control point.

The UPnP standard is a technical specification that defines the method for discovering the UPnP device where the UPnP control point is connected with the network. Discovery is performed as follows.

First of all, the UPnP control point multicast-transmits the discovery request shown by SSDP (Simple Service Discovery Protocol) on the network at the predetermined timing, and the UPnP device that received the discovery request returns the URL for showing the position where the device information is acquired to the UPnP control point that transmitted the above-mentioned discovery request. As a result, the UPnP control point acquires the URL that shows the position where the device information of the UPnP device connected with the network is acquired.

In addition, it is also possible that the UPnP control point acquires the URL that shows the position where the device information of the UPnP device connected with the network is acquired by receiving the multicast packet (NOTIFY method) that the UPnP device transmits at the predetermined timing such as when the UPnP device is connected with the network or the predetermined time elapses. That is, the above-mentioned multicast packet includes the URL that shows the position where the device information is acquired.

The UPnP control point included by the information processor compliant with UPnP acquires the information of UPnP device (hereinafter, called information of device) by accessing the UPnP device (hereinafter, called device) connected with the network by using the URL acquired by the method defined in the above-mentioned UPnP standard.

By the above-mentioned processing, the UPnP control point detects the UPnP device connected with the network. In addition, the above-mentioned acquired device information includes information about the service provided by the device, URL (Uniform Resource Locator) to acquire the information of the provided service and URL that shows the access destination to use the device providing service (to control the device).

Information processors compliant with UPnP such as personal computers PC2 and PC3 according to this embodiment mount the device discovery method defined in this UPnP standard.

As a result, the information processors compliant with UPnP can know that the UPnP device starts service or is providing service (alive) or ends service (bye).

In the above-mentioned embodiment, a UPnP AV media server device whose specification is formed as a device by the UPnP forum (http://www.upnp.org) is considered.

It is assumed that this UPnP AV media server device provides three services of contents directory (ContentDirectory), connection manager (ConnectionManager), and AV transport (AV Transport).

However, in the above-mentioned embodiment, the contents directory service is considered.

This contents directory service is a service that mainly returns information of contents depending on access from the control point.

Some actions are defined in the contents directory service, and here create object (CreateObject) action is considered.

CreateObject action is action that transmits the information of contents onto a device, and as this result, a delivery method of contents is returned.

As one delivery method of contents, it is defined that a URL issuing a POST method by the protocol of the HTTP (Hypertext Transfer Protocol) can be returned.

This POST method is a method that is usually used when sending information from the terminal on the user side to the server device by using a web browser (for example, when a user registers on a website and the user sends the information that the user input in the terminal to the server device).

To deliver contents, at first, the terminal (UPnP control point) on the user side transmits the information of contents to the server device (UPnP device) by CreateObject action. Next, the terminal (UPnP control point) on the user side transmits contents to the server device (UPnP device) by the POST method of the HTTP protocol.

The information includes contents such as contents titles, authors, and contents types (such as video/static image/music).

This is one use of a normal UPnP AV media server.

Information processors PC2 and PC3 of the delivery destination include a UPnP AV media server device. In addition, the personal computer (information processor) PC1 of the delivery source includes the UPnP AV media server control point.

That is, the personal computers (information processors) PC2 and PC3 of the delivery destination provide a function for receiving the information of contents by receiving CreateObject action and a function for receiving the contents by receiving the POST method of the HTTP protocol.

In addition, the personal computer PC1 of the delivery source performs a function for transmitting the information of contents by issuing CreateObject action and a function for delivering the contents by issuing the POST method of the HTTP protocol.

In addition, the personal computers PC2 and PC3 of the delivery destination according to the present embodiment additionally mount a WakeUpOnLAN function.

The WakeUpOnLAN function is a function mounted in many personal computers.

The mechanism of this function is as follows:

First of all, the personal computer supplies power to the network interface card the personal computer when the power supply of the personal computer itself is in the on and off states. As a result, the network interface card of the personal computer can receive a packet from the network even when the power supply of the personal computer itself is in the off state.

Next, the network interface, when the power supply of the personal computer itself is in the off state, analyzes the received packet and if it determines that the received packet is a specific packet called a magic packet, it turns on the power supply of the personal computer and operates for startup.

In addition, generally, when the power supply of the personal computer is in the off state, the network interface card of the personal computer cannot use an IP (Internet Protocol) address. As a result a MAC (Media Access Control) address allocated to the network interface is used to transmit/receive the above-mentioned magic packet.

Next, the function performed on the gateway device according to the embodiment of the present invention is explained.

As mentioned above, the gateway device has at least two network interfaces.

The one network interface is connected with the home network.

The other network interface is connected with the internet through a device such as a FTTH terminating device.

In addition, the gateway device has a database in a large-capacity hard disk drive (HDD), and can accumulate a lot of data (for example, the information such as contents).

The gateway device can perform both the function of the control point and the function of the device basically.

Figure 7:
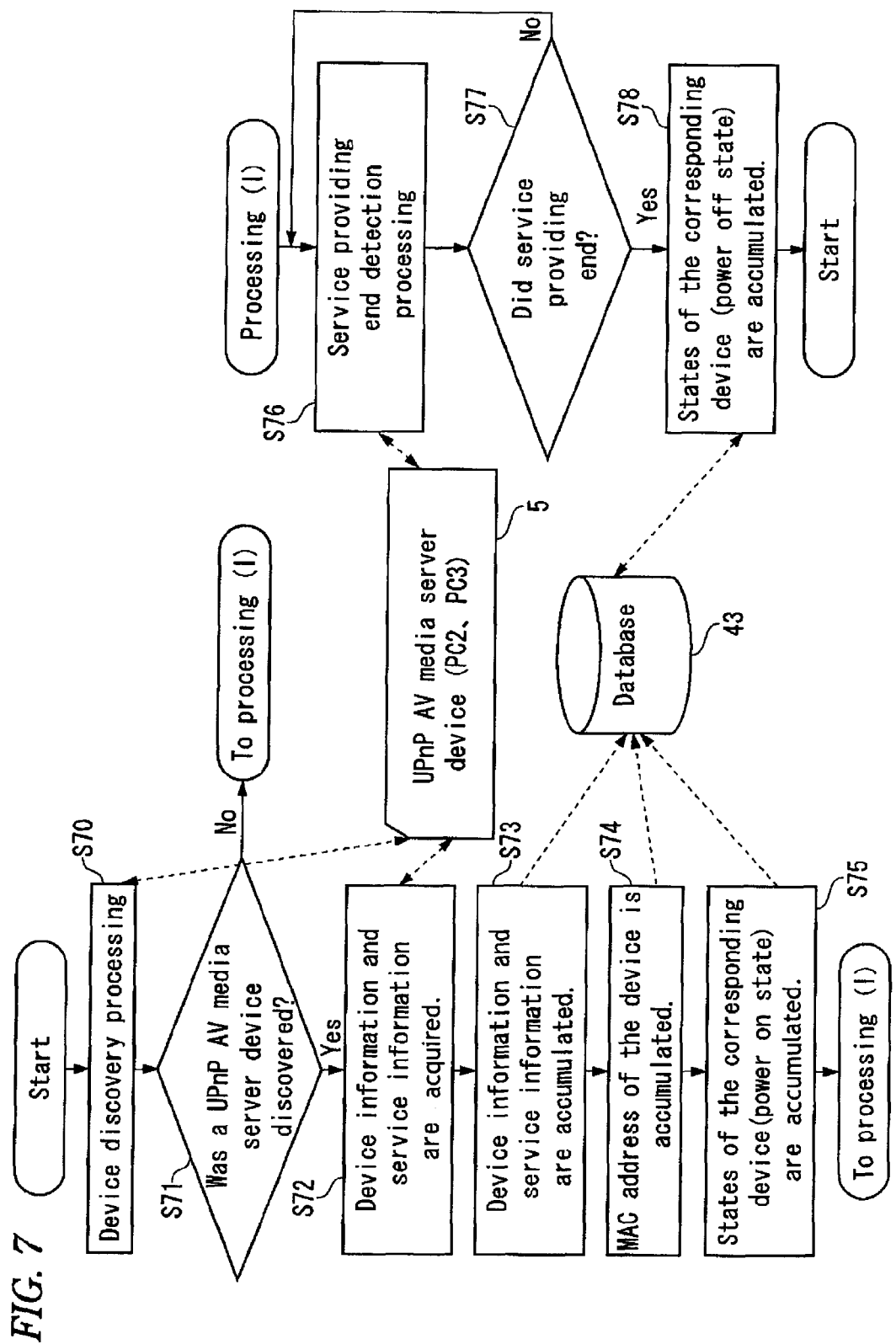
FIG. 7 is a flow chart explaining the processing function as the control point of the gateway device in FIG. 6.

FIG. 7 is a flow chart for explaining the processing function at the control point of the gateway device in FIG. 6.

Figure 8:
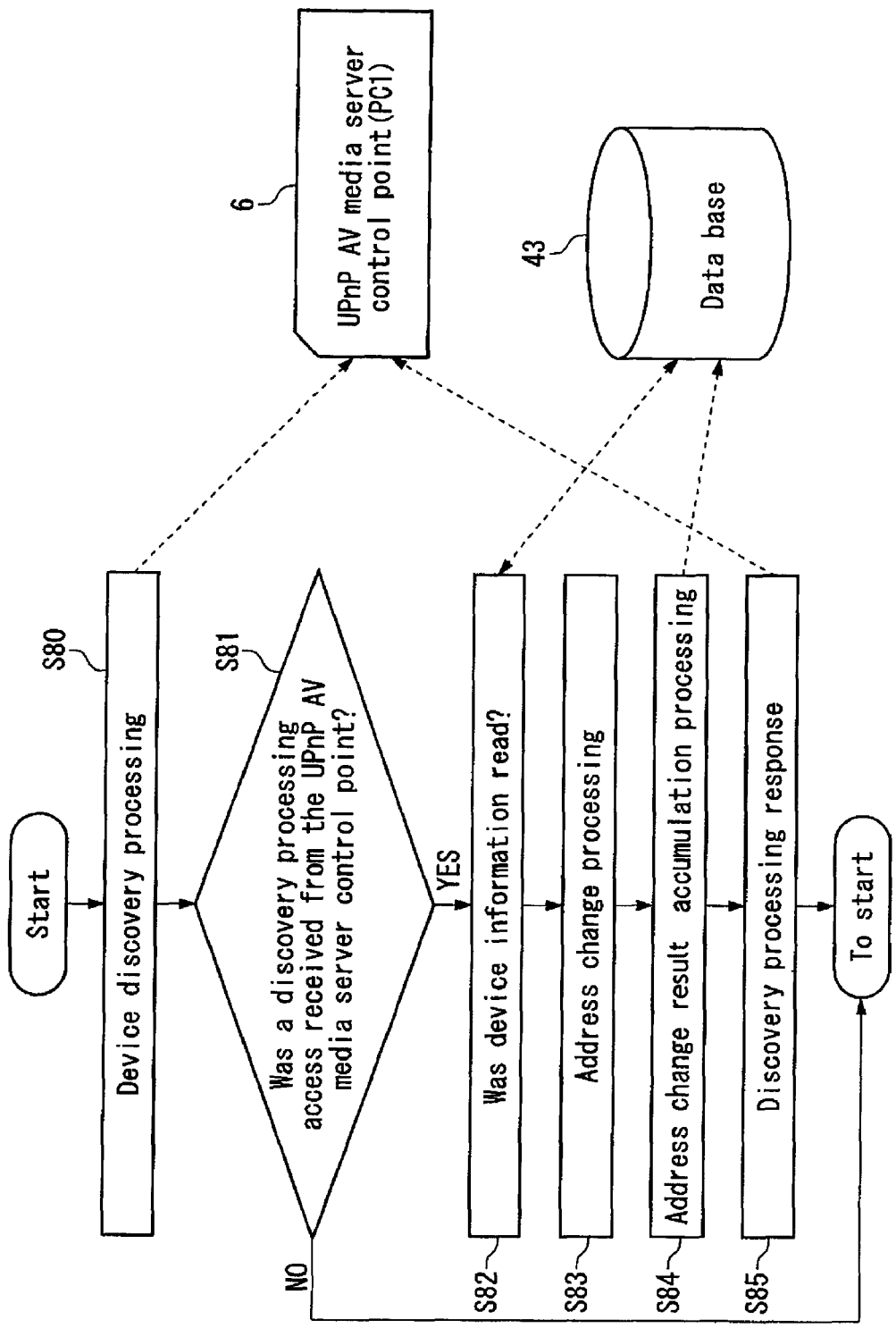
FIG. 8 is a flow chart explaining the processing function as the device of the gateway device in FIG. 6.

FIG. 8 is a flow chart for explaining the processing function at the device of the gateway device in FIG. 6.

Hereafter, two processing functions of the gateway device in FIG. 6 are described with reference to the flow charts in FIG. 7 and FIG. 8.

The processing function of the control point of the gateway device is explained on the basis of the flow chart in FIG. 7.

First of all, the gateway device performs the discovery processing of a device connected with the home network (70 in FIG. 7).

The gateway device, if it discovers a device (for example, UPnP AV media server device (personal computers PC2 and PC3 of the delivery destination) 5 connected with the home network (Yes in S71 in FIG. 7), acquires the device information and service information from the discovered device (S72 in FIG. 7).

The gateway device accumulates the acquired device information and service information in the database 43 (S73 in FIG. 7).

In addition, the gateway device associates the IP address and MAC address of the discovered device with the corresponding device and accumulates them in the database 43 (S74 in FIG. 7).

In addition, the gateway device notes or accumulates whether the power supply of the corresponding device is in the on state as the state of the corresponding device in the database (S75 in FIG. 7).

In addition, the gateway device, when it detects that the UPnP AV media server device 5 terminates service (Yes in S77 in FIG. 7), associates it with the information of the corresponding UPnP AV media server device and notes that the power supply is in the off state as the state of the corresponding device in the database (S78 in FIG. 7).

Further, the gateway device confirms whether or not this device information and service information had already been accumulated in the database 43 when it discovers a device and accumulates the device information and service information acquired from the device in the database 43.

The gateway device, when it determines that the device information and service information about the above-mentioned discovered device are already accumulated, accumulates the latest device information and service information in the database 43 by updating the discovered device information and service information.

In addition, the gateway device, when it determines that the power supply of the device is in the off state from information in the database 43, deletes the information and changes it to the information for showing that the power supply of the device is in the on state.

Further, a series of these processings are repeated.

In addition, the gateway device according to the present embodiment can correspond to a plurality of these devices when there are a plurality of devices connected with the home network.

As a result, by the configuration of the network system in above-mentioned FIG. 6, each information in the personal computers PC2 and PC3 of the delivery destination is accumulated in the database 43.

Next, based on the flow chart in FIG. 8, the processing function of the UPnP device of the gateway device is explained.

First of all, the gateway device receives the discovery request shown by the access from the UPnP AV media server control point (the personal computer PC1 of the delivery source) 6 on the internet side, that is, the discovery request shown by SSDP (S80 in FIG. 8).

The gateway device reads the device information accumulated in the database 43 (S82 in FIG. 8) when it receives the above-mentioned discovery request (Yes in S81 in FIG. 8) from the UPnP AV media server control point on the internet side.

The device information read from the above-mentioned database 43 includes various URLs that show the addresses of the UPnP devices (that is, the personal computer PC2 and PC3 of the delivery destination) connected with the home network side. The gateway device changes the address part shown in various URLs included in the above-mentioned read device information into the address that the gateway device has on the internet side (S83 in FIG. 8).

In addition, the above-mentioned device information includes a device name, manufacturer name, supported service names, URLs (SCPDURL) that show the position to acquire the service, and URLs (controlURL) for executing actions.

The above-mentioned address change processing is that the address part on the home network side included in the URL is replaced with the address on the internet side and the rest of the above-mentioned URL is changed into the information that can identify the URL before changing on the gateway side.

For example, when the address on the home network side of the gateway device is 10.0.0.1, the address of PC2 connected with the home network side is 10.0.0.2, the address on the internet side of the gateway device is 192.168.0.1, SCPDURL of the device information acquired from the above-mentioned PC2 is http://10.0.0.2/contentdirectory and SCPDURL after changing becomes http://192.168.0.1/2/contentdirectory.

That is, in the above-mentioned example, the address part is changed from "10.0.0.2" to "192.168.0.1", and as information to uniquely identify the URL before changing, "contentdirectory" is changed into "2/contentdirectory."

The gateway device corresponds the URLs before and after the above-mentioned change processing and registers the correspondence in the database 43 (S84 in FIG. 8). This is to realize the access to the device connected with the home network side by using the URL corresponding to the gateway device before changing when an access request to the URL after the above-mentioned changing is received from the UPnP AV media server control point on the internet side.

In addition, the gateway device transmits the device information including various URLs after the above-mentioned changing to the UPnP AV media server control point to which the above-mentioned discovery request is transmitted (S85 in FIG. 8).

The UPnP AV media server control point on the internet side can access the device connected with the home network through the gateway device by using various URLs after the above-mentioned changing.

When a plurality of information processors (here, the personal computers PC2 and PC3 of the delivery destination) are connected with the home network, it seems that there are two devices. As a result, the personal computer PC1 of the delivery source can access the personal computer PC2 that is one of the delivery destinations and another personal computer PC3.

Figure 9:
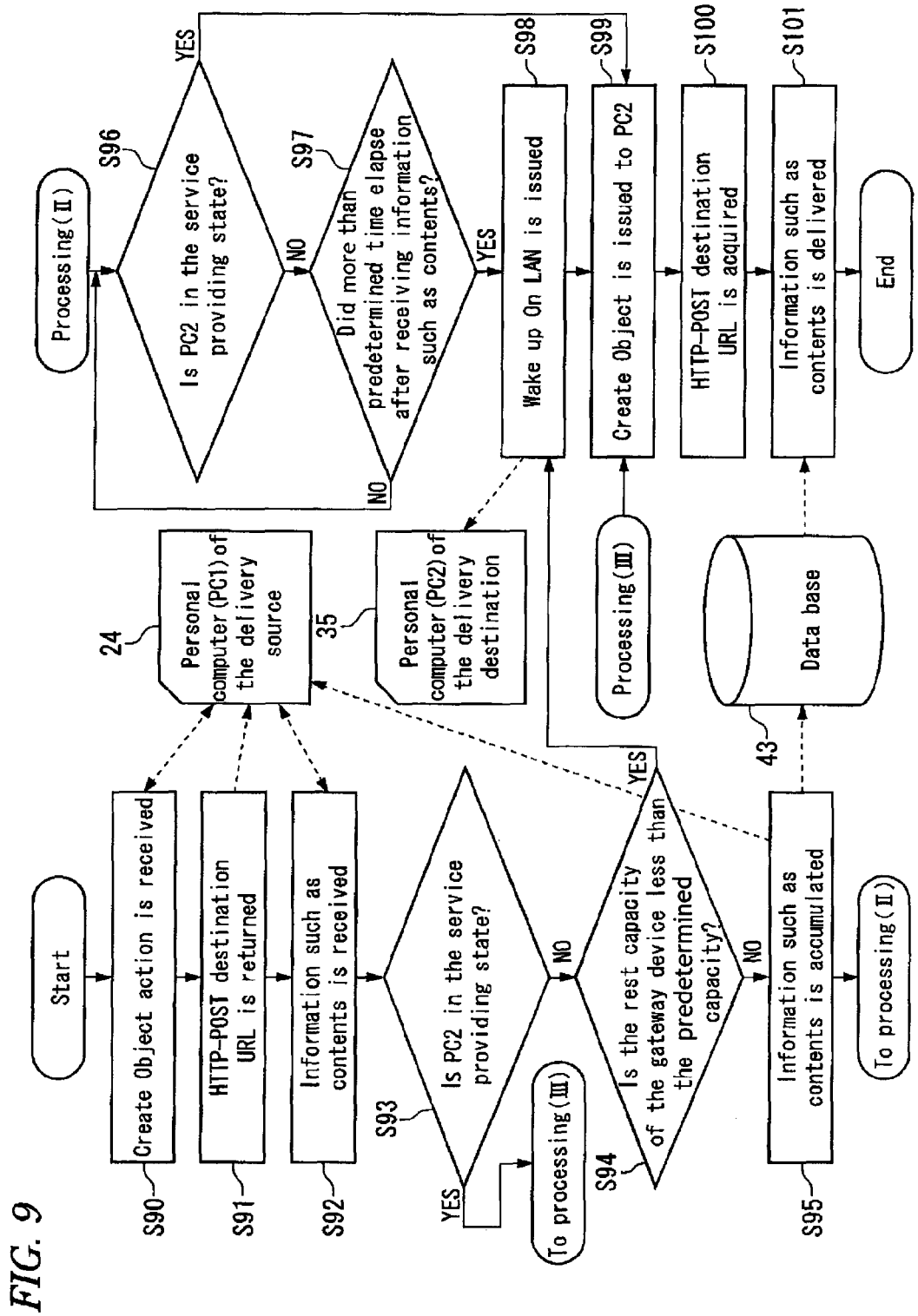
FIG. 9 is a flow chart explaining the delivery processing function of the information such as contents of the gateway device in FIG. 6.

FIG. 9 is a flow chart explaining the delivery processing function of the information such as contents of the gateway device in FIG. 6.

Here, the CreateObject action for delivering the information of contents by the gateway device is considered.

The CreateObject action is that the above-mentioned "control point" transmits the information of contents to the above-mentioned "device" and the "device" that received the above-mentioned "information of contents" returns the delivery method of the information of contents to the above-mentioned "control point."

Here, as a delivery method of contents, the POST method of the HTTP protocol is used. This content information includes titles and contents types such as video, static, image, and music.

The gateway device receives the CreateObject action transmitted from the delivery source PC1 (S90 in FIG. 9). This is because the delivery source PC1 transmits the above-mentioned CreateObject action by using the URL after changing acquired by the processing of the above-mentioned S85.

Further, as shown in Step S91, the gateway device returns the URL that is the processing destination of the HTTP-POST method of the contents and includes the address assigned to the network interface that the gateway device itself has on the internet side, to the personal computer PC1 of the delivery source and goes to Step S92.

In Step S92, the gateway device receives the contents from the personal computer PC1 of the delivery source.

In Step S93, the gateway device goes to Step S99 and issues the CreateObject action to the personal computer PC2 (or personal computer PC3) of the delivery destination when the personal computer PC2 (or personal computer PC3) of the delivery destination is in the state that can provide service (in the service providing state).

The personal computer PC2 (or personal computer PC3) that received the above-mentioned CreateObject action returns the URL that is the HTTP-POST destination, that is, the URL that includes the its address, to the gateway device.

The gateway device receives the URL that includes the address of the personal computer PC2 (or personal computer PC3) of the delivery destination from the personal computer PC2 (or personal computer PC3) or the delivery destination (S100 in FIG. 9).

At this point, the personal computer PC1 of the delivery, source executes processing of HTTP-POST method of the contents to the URL (URL including the IP address on the internet side of the gateway device) returned from the gateway device.

Further, as shown in Step S101, the gateway device receives the contents and executes the processing of the HTTP-POST method to the URL returned from the personal computer PC2 (or personal computer PC3) of the delivery destination.

As a result, delivery of information through the gateway device can be realized.

In Step S93, the case when the power supply of the personal computer PC2 of the delivery destination is in the off state (the personal computer PC2 of the delivery destination is not in the service providing state) is considered.

The gateway device can recognize that the power supply of the personal computer PC2 of the delivery destination is in the off state from the device states accumulated in the database 43.

Here, the gateway device, even when the power supply of the personal computer PC2 of the delivery destination is in the off state, similar to when it is in the on state, in response to the CreateObject action from the personal computer PC1 of the delivery source, returns the URL including the IP address assigned to the network interface on the internet side of the gateway device.

And, the personal computer PC1 of the delivery source executes the processing of the HTTP-POST method to the returned URL.

Then, in Step S94, the gateway device refers to the rest capacity (free space) of the hard disk. If it detects that the rest capacity is less than the predetermined capacity (for example, in the hard disk of 100 GB capacity, if 90 B is already used and the rest capacity is 10 GB), it issues the WakeUpOnLAN to the personal computer PC2 of the delivery destination. That is, the gateway device transmits the magic packet to the personal computer PC2 of the delivery destination.

Then, similar to the above-mentioned Steps S99 to S101, the gateway device, after detecting that the power supply of the personal computer PC2 of the delivery destination enters the on state by the discovery processing, executes the CreateObject action to the personal computer PC2 of the delivery destination and delivers the received contents to the device specified by the returned URL.

On the other hand, in Step S94, the gateway device, when it detects that the rest capacity of the hard disk is more than the predetermined capacity, goes to Step S95, checks the information of contents received by the CreateObject action and the contents received by the HTTP-POST method processing, and records it in the database 43 (accumulation of the information such as contents).

And, in Step S96, the gateway device, by the above-mentioned discovery processing, when it detects that the power supply of the personal computer PC2 of the delivery destination enters the on state (the personal computer PC2 of the delivery destination becomes the service providing state), (for example, when the user turns on the power supply to use the personal computer PC2 of the delivery destination), acquires the information such as contents accumulated in the above-mentioned S95 processing, delivers the information such as acquired contents and deletes the information such as contents accumulated in the database 43.

In addition, if the gateway device receives the information such as a plurality of contents before the power supply of the personal computer PC2 of the delivery destination enters the on state, it delivers all the information.

On the other hand, the gateway device, even if the power supply of the personal computer PC2 of the delivery destination is not in the on state, in Step S97, when more than the predetermined time elapses after receiving the content information (for example, more than 24 hours elapses), it goes to Step S98.

Here, the gateway device turns on the power supply by executing the WakeUpOnLAN to the personal computer PC2 of the delivery destination, and similar to the above-mentioned Steps S99 to S101 it delivers the information such as contents by executing the processing of the CreateObject action and HTTP-POST method.

As an alternative example of the above-mentioned condition that more than the predetermined time elapses, it is also possible to replace the condition with a condition that the information such as contents is delivered at the same time everyday (for example, information is delivered at 0:00 A.M. everyday by executing the WakeUpOnLAN).

In this case also, when the gateway device receives the information such as a plurality of contents from the personal computer PC2 of the delivery destination, it delivers information of all the received contents and deletes the information delivered from the database of the gateway device.

In addition, it is considered that the timing to turn off the power supply of the personal computer PC2 of the delivery destination is, for example, when more than the predetermined time elapses without using the personal computer PC2 or when the personal computer PC2 receives the protocol that turns off the power supply through the network similar to the WakeUpOnLAN.

To use the latter method, the gateway device has to execute the processing to transmit the protocol that turns off the power supply to the personal computer PC2 after the end of delivering the contents to the personal computer PC2 of the delivery destination.

In addition, the processing to deliver the information such as contents from the personal computer PC1 of the delivery source to the personal computer PC3 of the delivery destination is similar to the procedure of delivering processing to the above-mentioned personal computer PC2.

By the above-mentioned processing procedures, by the gateway device's temporarily caching the information such as contents, even if the information such as contents is delivered several times at the predetermined time interval from the personal computer 1 of the deliver source, efficient operation in which change to the on state of the power supply is not repeated can be realized.

Further, in the UPnP AV media server, a method with which the control point acquires the free space of the information processor that mounts the UPnP AV media server device is also defined.

This method uses the Browse action.

If the Browse action is issued, the information of contents and additional information of a Container (e.g., information for a file system such as a directory) can be acquired, and it is possible to include information called UPnP: storage Free corresponding to such as a container name.

By returning this UPnP: storage Free information on the device side, the control point side can recognize how many bytes of free space remain.

Further, as an action to delete the information such as contents and Container, the Destroy Object action is defined.

This DestroyObject action specifies the IDs usually called a contents ID or container ID, and deletes the information such as contents or a container.

The contents ID and container ID can be acquired by the Browse action.

By extending this action, in the case of a fixed ID such as "any," any of the contents are deleted.

As a result, if the control point accompanies "any" with the DestroyObject action as an ID, the device can delete any contents and extend the free space.

Here, the gateway device issues the Browse action and knows the free space of the personal computer PC2 or personal computer PC3 of the delivery destination from the UPnP: storage Free information.

When this free space is less than the predetermined capacity, the DestroyObject action is issued as an ID accompanying "any." After that, by delivering the information such as contents by the processing of the CreateObject action/HTTP-POST method processing, it is possible to prevent the state where the free space of the personal computer PC2 or personal computer PC3 of the delivery destination is occupied and delivery becomes impossible.

On the other hand, by the DestroyObject action, by specifying not the ID of "any" but the contents ID, the method to delete contents can also be realized.

In this case, the gateway side needs to determine which information to delete.

For example, as the information acquired by the Browse action (information called dc:date), it is possible to acquire the date and time of the information such as contents (for example, such as date and time when the information such as contents was created).

For example, after acquiring all the information can be in all the devices, the oldest information is selected and the DestroyObject action issued.

Other than this, also, though it is not particularly defined in the UPnP AV media server, a method in which priority of contents is determined and the contents to be deleted are determined by using these priority values can also be considered.

As a result, it becomes possible to prevent the state where the free space of the personal computer PC2 or personal computer PC3 of the delivery destination is occupied and delivery cannot be performed.

Further, when the free space of the personal computer PC2 of the delivery destination is less than the predetermined capacity, it is also possible to temporarily deliver the information such as contents to the personal computer PC3 of the delivery destination.

As a result, the state where delivery cannot be performed because the free space in the personal computer PC2 of the delivery destination is small can be prevented.

Because another personal computer PC3 of the delivery destination also receives the information such as contents similar to the personal computer PC2, it is possible to temporarily deliver the information such as contents that should be delivered to the personal computer PC2, to another personal computer PC3 by using the function.

Here, similar to when delivering to the personal computer PC2 as the delivery destination, it can be realized by using the CreateObject action/HTTP-POST method.

In addition, the recordable rest capacity is regularly checked (the above-mentioned Browse action) and if it is detected that the free space is increased by the user deleting information from the personal computer PC2 of the delivery destination, the information such as contents is received from another personal computer PC3 of the delivery destination.

At this reception, a method of receiving information such as contents is defined in the specification of the UPnP AV media server, it can be used.

More concretely, when the CreateObject action is executed, not only the URL to which the processing of the HTTP-POST method is executed but the contents ID is also returned.

By executing the Browse action with this contents ID, the information of contents is returned.

As a method to acquire the contents, when it is possible to use the request (GET) processing of the HTTP protocol, the URL to which the HTTP-GET processing is performed is returned in the above-mentioned returned information.

By executing the HTTP-GET processing to this URL, it is possible to acquire the information such as contents.

After receiving this information, the CreateObject action/HTTP-POST method processing has to be executed to the personal computer PC2 of the delivery destination.

In some cases, family members or others do not want information to be delivered to another information processorTo preserve privacy, information relating to permissible or impermissible processors is added when the CreateObject action for delivering the information of contents is performed.

For example, information to not deliver to another information processor can be selected.

Due to a privacy matter, from the very first, there could be a case that users do not want to record information in the gateway device.

In this case, similar to the above-mentioned case, information to show that cache is prohibited is added as the information such as contents, and whether to cache or not has to be determined based on this.

Further, more details about the CreateObject action is described.

The CreateObject action can concretely call the container ID and Elements as arguments (input), and as a result, return the object ID and Result.

The container ID is an ID of the container that can be acquired by actions such as the Browse action.

A container can include the contents and containers.

By specifying the container ID, the information of contents can be created in the container.

That is, by specifying the container ID as Elements, the information of contents is created.

As an example of the contents of Elements, it becomes the one described in XML format as shown in the following [Expression 1].

[Expression 1]
Elements

```
<DIDL-Lite xmlns:dc="http://purl.org/dc/elements/1.1/"
  xmlns:upnp="urn:schemas-upnp-org:metadata-1-0/upnp/"
  xmlns="urn:schemas-upnp-org:metadata-1-0/DIDL-Lite/">
  <item id="" parentID="10" restricted="0">
    <dc:title>Contents Name</dc:title>
    <upnp:class>object.item.videoItem</upnp:class>
    <res protocolInfo="*:*:*:*"></res>
  </item>
</DIDL-Lite>
```

As for the above-mentioned description, the character string (Contents Name) surrounded by the tag of the dc: title becomes the information that describes the contents name. As a result, because Elements is described in the XML format, to add any information, it becomes easily possible to determine a tag name.

As a returned value, the returned Result becomes described in the XML format similar to the above-mentioned Elements as shown in the following [Expression 2].

[Expression 2]
Result

```
<DIDL-Lite xmlns:dc="http://purl.org/dc/elements/1.1/"
  xmlns:upnp="urn:schemas-upnp-org:metadata-1-0/upnp/"
  xmlns="urn:schemas-upnp-org:metadata-1-0/DIDL-Lite/">
  <item id="12" parentID="10" restricted="0">
    <dc:title>Contents Name</dc:title>
    <upnp:class>object.item.videoItem</upnp:class>
    <res protocolInfo="http:*:video/mpeg:*">
    importUri="http://10.0.0.1/postdir">
    http://10.0.0.1/contentdir?id=10</res>
  </item>
</DIDL-Lite>
```

As for the above-mentioned description, "http://10.0.1/postdir" described as the import URI (importUri) becomes the URL to which the HTTP-POST is executed.

Here, 10.0.0.1 shows the IP address of the delivery destination.

In addition, in the above-mentioned Elements of [Expression 1], the value of id property in the tag of item was " ", though the value of id property in the Result of [Expression 2] is "12". This values shows the contents ID (the same value is returned as the object ID as well).

Further, the information of contents acquired by the Browse action is also described in the XML format similar to the above-mentioned case. As a result, it is possible to extend the information of contents.

What is claimed is:

1. An information processing control apparatus connected with a plurality of networks including first and second networks, the first and second networks each having a plurality of information processors capable of selectively providing services such as information including content to other information processors configured as delivery destinations, comprising:
- at least one processor including a device information and service information acquiring section for acquiring device information and service information of a selected information processor set in the delivery destination configuration in the second network;
- a service providing section for alternatively providing service by using acquired device information and service information from a selected service provider in the first network;
- a service use section for receiving and delivering information including contents from the first network by using the service alternatively provided; and
- a service providing state change section for changing the information processor in the second network to the service providing state;
- wherein the apparatus changes the information processor of the delivery destination to the service providing state and deliver information including the contents to the information processor of the delivery destination when the information including the contents is received from the first network and when the information processor of the delivery destination in the second network is not in the service providing state,
- the information processing control apparatus, further comprising:
- a contents information recording section for recording the information including the received contents;
- a device rest capacity detecting the recordable rest capacity of the information processing control apparatus; and
- a contents information deletion section for deleting the information including the recorded contents;
- wherein the apparatus temporarily records information including the contents by the contents information recording section when the information processor of the delivery destination in the second network is not in the service providing state and receives information including contents from the first network, and the apparatus changes the information processor of the delivery destination in the second network to the service providing state and deletes the information including the contents by the contents information deletion section after delivering information including the contents to the information processor of the delivery destination when the device rest capacity detecting section detects that the recordable rest capacity is less than the predetermined capacity.

2. The apparatus according to claim 1, wherein:
the contents information deletion section deletes information including the contents after delivering the information including the contents to the information processor of the delivery destination when the information processor of the delivery destination in the second network enters the service providing state before it is detected that the recordable rest capacity is less than the predetermined capacity.

3. The apparatus according to claim 1, wherein:
the information processing control apparatus further comprises an information processor rest capacity detecting section for detecting the recordable rest capacity of the information processor of the delivery destination in the second network; and
wherein the service use section does not deliver information including the contents if it is detected that the rest recordable capacity of the information processor of the delivery destination is less than the predetermined capacity when information including the contents is delivered to the information processor of the delivery destination in the second network.

4. The apparatus according to claim 1, wherein the information processing control apparatus, further comprising:
an information processor rest capacity detecting section for detecting the recordable rest capacity of the information processor of the delivery destination in the second network; and
an information processor rest capacity increasing instruction section for issuing an instruction to increase the recordable rest capacity to the information processor of the delivery destination in the second network;
wherein the information processor rest capacity increasing instruction section it delivers information including the contents after increasing the recordable rest capacity by issuing the recordable rest capacity if it is detected that the recordable rest capacity of the information processor of the delivery destination is less than the predetermined capacity when information including the contents is delivered to the information processor of the delivery destination in the second network.

5. The apparatus according to claim 1, wherein the information processing control apparatus, further comprising:
an information processor rest capacity detecting section for detecting the recordable rest capacity of the information processor of the delivery destination in the second network; and
a contents information deletion instruction section for issuing an instruction to delete information including contents of low priority after determining the priority of information including the contents to the information processor of the delivery destination in the second network;
wherein the contents information deletion section delivers information including the contents after increasing the recordable rest capacity by issuing an instruction to delete the information including the contents of low priority if it is detected that the recordable rest capacity of the information processor of the delivery destination is less than the predetermined capacity when information including the contents is delivered to the information processor of the delivery destination in the second network.

6. The apparatus according to claim 1, wherein the information processing control apparatus, further comprising:
an information processor rest capacity detecting section for detecting the recordable rest capacity of the information processor of the delivery destination in the second network;
a delivery section for delivering the information including the contents to another information processor different from the information processor of the delivery destination in the second network; and
a reception section for receiving the information including the contents from another information processor;
wherein the delivery section delivers information including the contents to another information processor if it is detected that recordable rest capacity of the information processor of the delivery destination is less than the predetermined capacity when the information including the contents to the information processor of the delivery destination in the second network, after that again it receives information including the contents from another information processor and delivers the information including the contents to the information processor of the delivery destination in the second network when it is detected that the recordable rest capacity of the information processor of the delivery destination in the second network is more than the predetermined capacity.

7. The apparatus according to claim 6, wherein the information processing control apparatus, further comprising:
a delivery enable information determination section for determining the delivery permission information to another information processor added to the information including the received contents;
wherein the delivery section does not deliver information including the contents to another information processor when it is determined that the it does not have the delivery permission information to the other information processor.

8. The apparatus according to claim 1, comprising
a cache disable information determination section for determining the cache disable information added to the information including the received contents;
wherein the service use section immediately delivers the information including the contents to the information processor of the delivery destination in the second network without recording the information including the contents when it is determined that it has the cache disable information.

9. An information processing control apparatus connected with a plurality of networks including first and second networks, comprising:
at least one processor including a device information and service information acquiring section for acquiring the device information and service information of the information processor of the delivery destination in the above-mentioned second network;
a service providing section for alternatively providing service by using the acquired device information and service information to the access from the first network;
a service use section for receiving and delivering information including contents from the first network by using the alternatively provided service; and
a service providing state change section for changing the information processor of the delivery destination in the second network to the service providing state;
wherein the apparatus changes the information processor of the delivery destination to the service providing state and deliver information including the contents to the information processor of the delivery destination if the information processor of the delivery destination in the second network is not in the service providing state when the information including the contents is received from the first network,
the information processing control apparatus, further comprising:
a contents information recording section for recording the information including the received contents;
a time elapse detecting section for detecting the time elapse after receiving information including the contents; and
the contents information deletion section for deleting the information including the recorded contents;
wherein the apparatus temporarily records the information including the contents by the contents information recording section when the information processor of the delivery destination in the second network is not in the service providing state and it receives information including contents from the first network, and the apparatus changes the information processor of the delivery destination in the second network to the service providing state and deletes the information including the contents by the contents information deletion section after delivering information including the contents to the information processor of the delivery destination when it is detected that more than the predetermined time elapses by the time elapse detecting section.

10. The apparatus according to claim 9, wherein:
the contents information deletion section deletes information including the contents after delivering the information including the contents to the information processor of the delivery destination when the information processor of the delivery destination in the second network enters the service providing state before detecting that more than the predetermined time elapses after receiving information including the contents.

11. An information processing control apparatus connected with a plurality of networks including the first and second networks, comprising:
at least one processor including a device information and service information acquiring section for acquiring the device information and service information of the information processor of the delivery destination in the above-mentioned second network;
a service providing section for alternatively providing service by using the acquired device information and service information to the access from the first network;
a service use section for receiving and delivering information including contents from the first network by using the alternatively provided service; and
a service providing state change section for changing the information processor in the second network to the service providing state;
wherein the apparatus, wherein changes the information processor of the delivery destination to the service providing state and deliver information including the contents to the information processor of the delivery destination if the information processor of the delivery destination in the second network is not in the service providing state when the information including the contents is received from the first network;
the apparatus, further comprising:
a contents information recording section for recording the information including the received contents;
a current time detecting section for detecting whether the current time is the predetermined time or not; and
a contents information deletion section for deleting the information including the recorded contents;
wherein the apparatus temporarily records the information including the contents by the contents information recording section if the information including contents is received from the first network when the information processor of the delivery destination in the second network is not in the service providing state, and the apparatus changes the information processor of the delivery destination in the second network to the service providing state and deletes the information including the contents by the contents information deletion section after delivering information including the contents to the information processor of the delivery destination when it is detected that information including the contents is temporarily recorded by the contents information recording section and the current time is the predetermined time.

12. The apparatus according to claim 11, wherein:
the contents information deletion section deletes information including the contents after delivering the information including the contents to the information processor of the delivery destination when the information processor of the delivery destination in the second network enters the service providing state before it is detected that the current time is the predetermined time.

13. A method to deliver information executed by the information processing control apparatus connected with a plurality of networks including the first network and second network, comprising:
- a step for receiving information including the contents from the first network;
- a step for detecting whether the information processor of the delivery destination in the second network is in the service providing state or not;
- a step in which the information processing control apparatus itself detects the recordable rest capacity;
- a step for temporarily recording the information including the contents by the information processing control apparatus when the information processor of the delivery destination in the second network is not in the service providing state and the information including the contents is received by the information processing control apparatus;
- a step for changing the information processor of the delivery destination in the second network to the service providing state when it is detected that the recordable rest capacity is less than the predetermined capacity; and
- a step for delivering the information including the contents to the information processor of the delivery destination in the second network changed to the service providing state.

14. A method to deliver the information executed by the information processing control apparatus connected with a plurality of networks including the first network and second network, comprising:
- a step for receiving information including the contents from the first network;
- a step for detecting whether the information processor of the delivery destination in the second network is in the service providing state or not;
- a step for detecting the time elapse after receiving the information including the contents;
- a step for temporarily recording the information including the contents by the information processing control apparatus when the information processor of the delivery destination in the second network is not in the service providing state and it receives the information including the contents by the information processing control apparatus;
- a step for changing the information processor of the delivery destination in the second network to the service providing state when it is determined that more than the predetermined time elapses after receiving the information including the contents; and
- a step for delivering the information including the contents to the information processor of the delivery destination in the second network changed to the service providing state.

15. A non-transitory computer-readable recording medium in which the program used in the information processing control apparatus connected with the plurality of networks including the first and second networks is recorded, the program comprising:
- a reception step for receiving information including the contents from the first network;
- a step for detecting whether the information processor of the delivery destination in the second network is in the service providing state or not;
- a step in which the information processing control apparatus itself detects the recordable rest capacity;
- a step for temporarily recording the information including the contents by the information processing control apparatus when the information processor of the delivery destination in the second network is not in the service providing state and the information including the contents is received by the information processing control apparatus;
- a step for changing the information processor of the delivery destination in the second network to the service providing state when it is detected that the recordable rest capacity is less than the predetermined capacity; and
- a step for delivering the information including the contents to the information processor of the delivery destination in the second network changed to the service providing state.

16. A non-transitory computer-readable recording medium in which the program used in the information processing control apparatus connected with the plurality of networks including the first and second networks is recorded, the program comprising:
- a step for receiving information including the contents from the first network;
- a step for detecting whether the information processor of the delivery destination in the second network is in the service providing state or not;
- a step for detecting the time elapse after receiving the information including the contents;
- a step for temporarily recording the information including the contents by the information processing control apparatus when the information processor of the delivery destination in the second network is not in the service providing state and the information including the contents is received by the information processing control apparatus;
- a step for changing the information processor of the delivery destination in the second network to the service providing state when it is determined that more than the predetermined time elapses after receiving the information including the contents; and
- a step for delivering the information including the contents to the information processor of the delivery destination in the second network changed to the service providing state.

* * * * *